(12) United States Patent
Inaguchi et al.

(10) Patent No.: US 10,792,776 B2
(45) Date of Patent: Oct. 6, 2020

(54) MACHINE TOOL AND ORIGIN POINT CORRECTION METHOD

(71) Applicant: FANUC CORPORATION, Yamanashi (JP)

(72) Inventors: Yuuzou Inaguchi, Yamanashi-ken (JP);
Gaku Isobe, Yamanashi-ken (JP);
Yasuaki Koyama, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/026,447

(22) Filed: Jul. 3, 2018

(65) Prior Publication Data

US 2019/0009382 A1 Jan. 10, 2019

(30) Foreign Application Priority Data

Jul. 6, 2017 (JP) .................................. 2017-132523

(51) Int. Cl.
*B23Q 3/157* (2006.01)
*B23Q 3/155* (2006.01)
(Continued)

(52) U.S. Cl.
CPC ...... *B23Q 3/15534* (2016.11); *B23Q 3/15706* (2013.01); *B23Q 16/065* (2013.01);
(Continued)

(58) Field of Classification Search
CPC ......... Y10T 483/12–15; Y10T 483/179–1798; Y10T 483/1873–1882; B23Q 3/15503;
(Continued)

(56) References Cited

U.S. PATENT DOCUMENTS 3,994,061 A * 11/1976 Tomita .................. B23B 31/263
483/35
4,414,732 A * 11/1983 Tomita ............... B23Q 3/15553
483/35
(Continued)

FOREIGN PATENT DOCUMENTS

CN 102672511 A 9/2012
CN 103370661 A 10/2013
(Continued)

OTHER PUBLICATIONS

English Abstract and Machine Translation for Japanese Publication No. 2015-096280 A, published May 21, 2015, 13 pgs.
(Continued)

*Primary Examiner* — Erica E Cadugan
*Assistant Examiner* — Michael Vitale
(74) *Attorney, Agent, or Firm* — Fredrikson & Byron, P.A.

(57) ABSTRACT

A machine tool includes a turning position adjustment unit configured to control a turning drive unit so that, when a tool is transferred between a spindle and a grip, if an amount of sway of the tool is greater than or equal to a threshold value, a turret is turned and the amount of sway of the tool becomes less than the threshold value, and an origin point correcting unit configured to correct an origin point in accordance with a turning position of the turret acquired by a turning position acquisition unit, when the turret is turned by the turning drive unit so that the amount of sway of the tool becomes less than the threshold value.

9 Claims, 10 Drawing Sheets

(51) Int. Cl.
*B23Q 16/06* (2006.01)
*B23Q 17/09* (2006.01)
*B23Q 17/12* (2006.01)
*G05B 19/402* (2006.01)
*G05B 19/404* (2006.01)
*G05B 19/406* (2006.01)
*B23Q 17/00* (2006.01)

(52) U.S. Cl.
CPC .............. *B23Q 17/09* (2013.01); *B23Q 17/12* (2013.01); *G05B 19/402* (2013.01); *G05B 19/404* (2013.01); *G05B 19/406* (2013.01); *B23Q 17/00* (2013.01); *Y10T 483/12* (2015.01); *Y10T 483/1795* (2015.01)

(58) Field of Classification Search
CPC ............ B23Q 3/15526; B23Q 3/15534; B23Q 3/15706
USPC ................................ 483/4–13, 54–57, 66–67
See application file for complete search history.

(56) References Cited

U.S. PATENT DOCUMENTS

| | | | | |
|---|---|---|---|---|
| 5,435,067 | A * | 7/1995 | Uchida | ................. B23Q 16/02 33/1 N |
| 7,175,374 | B2 * | 2/2007 | Takaku | ................. B23Q 17/003 29/593 |
| 7,445,587 | B2 * | 11/2008 | Kojima | ............. B23Q 3/15706 483/56 |
| 2008/0082200 | A1 | 4/2008 | Ikeda | |
| 2013/0331245 | A1 * | 12/2013 | Koike | ................. B23Q 3/15526 483/54 |
| 2017/0087678 | A1 * | 3/2017 | Isobe | ................. B23Q 3/15706 |

FOREIGN PATENT DOCUMENTS

| | | | |
|---|---|---|---|
| CN | 103801967 | A | 5/2014 |
| CN | 105855996 | A | 8/2016 |
| FR | 2984787 | B1 | 1/2014 |
| JP | 1222846 | A | 9/1989 |
| JP | 2001232531 | A | 8/2001 |
| JP | 200211632 | A | 1/2002 |
| JP | 2006239854 | A | 9/2006 |
| JP | 2009113160 | A | 5/2009 |
| JP | 2010140225 | A | 6/2010 |
| JP | 2011173197 | A | 9/2011 |
| JP | 2011189459 | A | 9/2011 |
| JP | 201286350 | A | 5/2012 |
| JP | 4990316 | B2 | 8/2012 |
| JP | 2013132706 | A | 7/2013 |
| JP | 201551494 | A | 3/2015 |
| JP | 201560480 | A | 3/2015 |
| JP | 201596280 | A | 5/2015 |
| JP | 201598063 | A | 5/2015 |
| JP | 20177030 | A | 1/2017 |

OTHER PUBLICATIONS

English Abstract and Machine Translation for Japanese Publication No. 2015-051494 A, published Mar. 19, 2015, 14 pgs.
English Abstract and Machine Translation for Japanese Publication No. 2013-132706 A, published Jul. 8, 2013, 11 pgs.
English Abstract and Machine Translation for Japanese Publication No. 2012-086350 A, published May 10, 2012, 10 pgs.
English Abstract and Machine Translation for Japanese Publication No. 2011-189459 A, published Sep. 29, 2011, 9 pgs.
English Abstract and Machine Translation for Japanese Publication No. 2009-113160 A, published May 8, 2009, 10 pgs.
English Abstract and Machine Translation for Japanese Publication No. 2006-239854 A, published Sep. 14, 2006, 11 pgs.
English Abstract and Machine Translation for Japanese Publication No. 2002-011632 A, published Jan. 15, 2002, 6 pgs.
English Abstract and Machine Translation for Japanese Publication No. 2011-173197 A, published Sep. 8, 2011, 19 pgs.
English Abstract and Machine Translation for Japanese Publication No. 2017-007030 A, published Jan. 12, 2017, 15 pgs.
English Abstract and Machine Translation for Japanese Publication No. 2001-232531 A, published Aug. 28, 2001, 9 pgs.
English Abstract and Machine Translation for Japanese Publication No. JPH01-222846 A, published Sep. 6, 1989, 5 pgs.
English Abstract and Machine Translation of French Publication No. 2984787 B1, published Jan. 10, 2014, 11 pgs.
English Machine Translation of Japanese Publication No. 4990316 B2, published Aug. 1, 2012, 6 pgs.
English Abstract and Machine Translation of Chinese Publication No. 102672511 A, published Sep. 19, 2012, 17 pgs.
English Abstract and Machine Translation of Chinese Publication No. 103370661 A, published Oct. 23, 2013, 27 pgs.
English Abstract and Machine Translation of Chinese Publication No. 103801967 A, published May 21, 2014, 10 pgs.
English Abstract and Machine Translation for Japanese Publication No. 2015-060480 A, published Mar. 30, 2015, 14 pgs.
English Abstract and Machine Translation for Japanese Publication No. 2015-098063 A, published May 28, 2015, 6 pgs.
English Abstract and Machine Translation for Japanese Publication No. 2010-140225 A, published Jun. 24, 2010, 11 pgs.
English Abstract and Machine Translation for Chinese Publication No. CN105855996A, published Aug. 17, 2016, 7 pgs.

* cited by examiner

MACHINE TOOL AND ORIGIN POINT CORRECTION METHOD

CROSS-REFERENCE TO RELATED APPLICATION

This application is based upon and claims the benefit of priority from Japanese Patent Application No. 2017-132523 filed on Jul. 6, 2017, the contents of which are incorporated herein by reference.

BACKGROUND OF THE INVENTION

Field of the Invention

The present invention relates to machine tool having a tool changer in which a turret provided with a plurality of tool retaining grips is turned by a turning drive unit to a turning position corresponding to a grip that retains a desired tool, and change of a tool mounted on a spindle is carried out. The present invention further relates to an origin point correction method for correcting an origin point that serves as a reference when determining a turning position of the turret.

Description of the Related Art

Japanese Laid-Open Patent Publication No. 2015-096280 discloses a machine tool having a tool changer that carries out change of a tool of a spindle. The tool changer has a tool magazine in which tools are retained on a grip arm, and by turning the tool magazine, a desired tool is moved to a tool change position, where change of the tool of the spindle is performed at the tool change position.

SUMMARY OF THE INVENTION

With the technique of Japanese Laid-Open Patent Publication No. 2015-096280, a desired tool is moved to the tool change position by turning the turret (tool magazine). However, for this purpose, it is necessary to determine the turning position of the turret with high accuracy. The turning position of the turret is determined by setting a specific turning position of the turret as an origin point, and by an amount of turning of the turret with reference to the origin point. Although the turning position of the turret is determined by a controller of the machine tool, there may be situations in which a deviation occurs between the actual origin point and the origin point of the turret that is set in the controller. In such a case, it is necessary to perform a correction so that the origin point of the turret that is set in the controller coincides with the actual origin point of the turret.

Conventionally, when the turning position of the turret is placed at the origin point, a reference surface formed on the turret has been made to become horizontal. In the case of correcting the origin point of the turret that is set in the controller, the turret is turned in a manner so that the reference surface becomes horizontal, and the turning position of the turret at that time is set as the origin point in the controller. However, in order to turn the turret in a manner so that the reference surface becomes horizontal, an operator has been required to turn the turret manually while confirming a detection value of a dial gauge or the like. For this reason, there is a problem in that such an operation leads to an increase in the workload and number of steps performed by the operator.

The present invention has been made to solve the above problems, and has the object of providing a machine tool and an origin point correcting method, which are capable of reducing the workload and number of steps performed by an operator.

An aspect of the present invention is characterized by a machine tool including a tool changer configured to change a tool mounted on a spindle by way of a turret provided with a plurality of grips for retaining the tool, comprising a turning drive unit configured to turn the turret, a turning position acquisition unit configured to acquire a turning position of the turret with respect to an origin point, a sway amount acquisition unit configured to acquire an amount of sway of the tool when the tool is transferred between the grip and the spindle, a turning position adjustment unit configured to control the turning drive unit so that, when the tool is transferred, if the amount of sway of the tool is greater than or equal to a threshold value, the turret is turned and the amount of sway of the tool becomes less than the threshold value, and an origin point correcting unit configured to correct the origin point in accordance with a turning position of the turret acquired by the turning position acquisition unit, when the turret is turned by the turning drive unit so that the amount of sway of the tool becomes less than the threshold value.

According to the present invention, it is possible to reduce the workload and number of steps performed by the operator.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

First Embodiment

[Configuration of Machine Tool]

Figure 1:
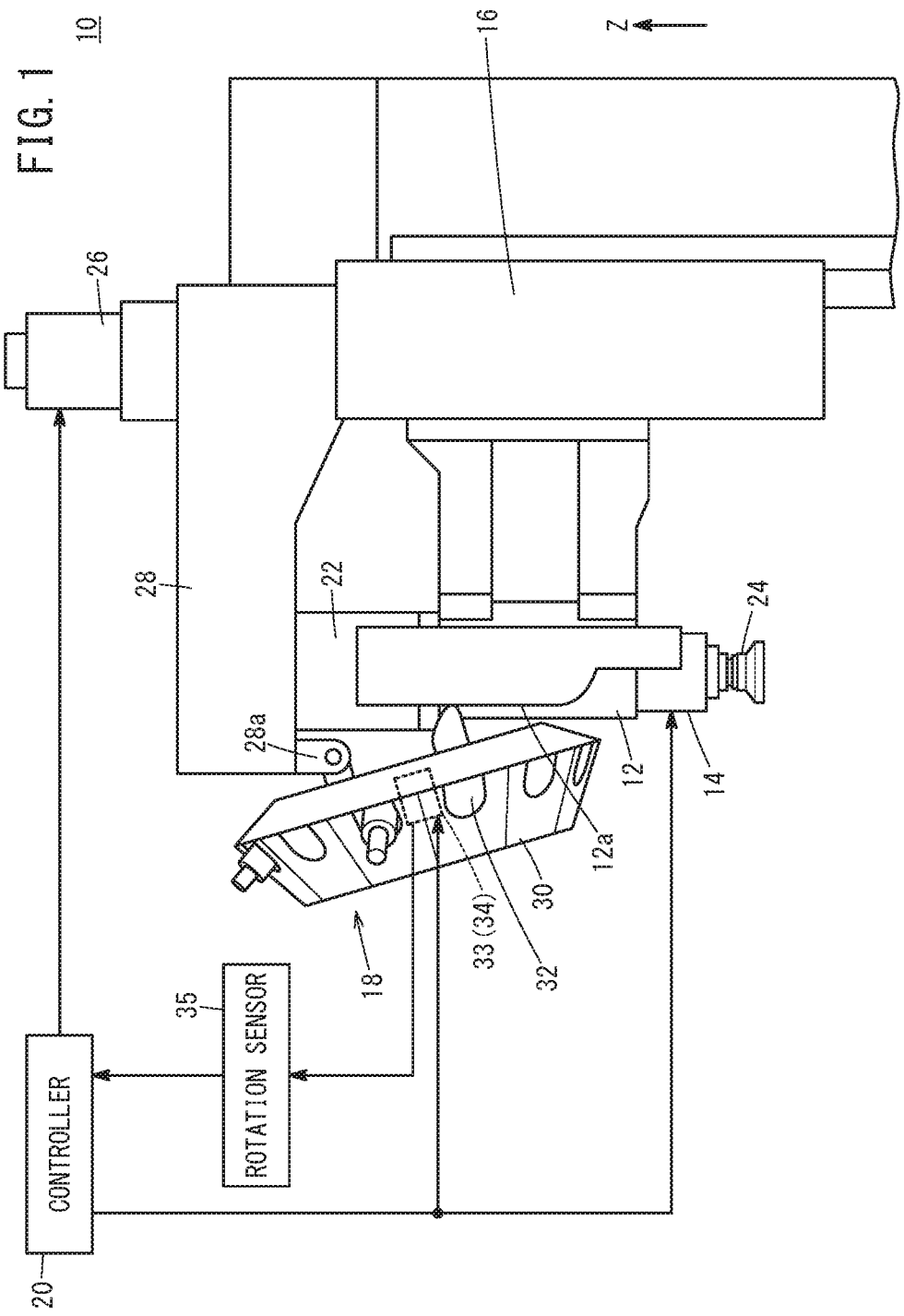
FIG. 1 is a schematic diagram showing the vicinity of a spindle head of a machine tool.

A description will be given concerning a machine tool 10 according to a first embodiment. FIG. 1 is a schematic diagram of the vicinity of a spindle head 12 of the machine tool 10. The machine tool 10 is a vertical type machining center, in which the spindle head 12 that rotatably supports a spindle 14 is lowered, and machining is performed on a non-illustrated workpiece by a tool 24 that is attached to the spindle 14. In the description given below, in FIG. 1, a vertical direction is set on the Z-axis, an upward direction is treated as a positive direction, and a downward direction is treated as a negative direction.

The machine tool 10 includes the spindle 14, the spindle head 12, a column 16, a tool changer 18, and a controller 20. The spindle 14 is disposed on the spindle head 12 so as to be rotatable about an axis of rotation parallel to the Z-axis direction. A spindle motor 22 is provided on the spindle head 12, and the spindle 14 is rotatably driven by the spindle motor 22. The tool 24 is attached in a detachable manner to a non-illustrated mounting hole provided at the distal end of the spindle 14. The tool 24 rotates integrally together with rotation of the spindle 14.

The spindle head 12 is disposed on the column 16 so as to be capable of moving in the Z-axis direction. The spindle head 12 is movably connected integrally with a nut of a non-illustrated ball screw assembled inside the column 16. A non-illustrated screw shaft of the ball screw is rotatably driven by a Z-axis motor 26, whereby the spindle head 12 moves together with the nut in the Z-axis direction.

The tool changer 18 is disposed on an arm 28 that extends horizontally from the column 16. The tool changer 18 is a device for automatically changing the tool 24 attached to the spindle 14. The tool changer 18 includes a turret 30 which is pivotally mounted on the arm 28. On an outer circumferential side of the turret 30, a plurality of grips 32 are provided at equal intervals in the circumferential direction. The grips 32 retain the tool 24 in a detachable manner. The turret 30 is turned by a turning drive motor 33. The turning drive motor 33 constitutes part of a turning drive unit 34. The rotational position of the turning drive motor 33 is detected by a rotation sensor 35. The turret 30 is disposed so as to be capable of swinging about an attachment member 28a of the arm 28. A cam 12a which causes the turret 30 to swing is provided on the spindle head 12.

Figure 2:
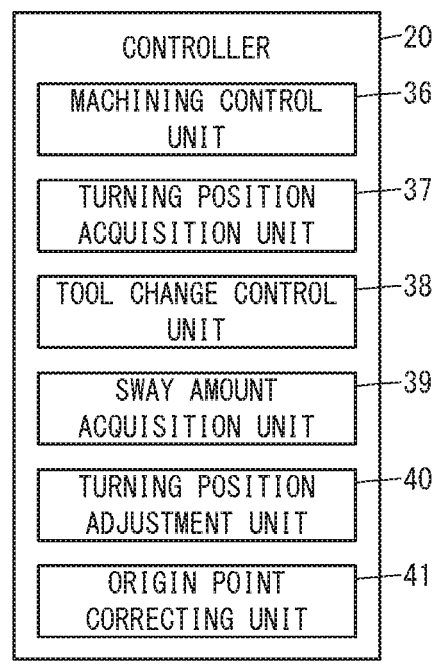
FIG. 2 is a block diagram showing a functional configuration of a controller.

FIG. 2 is a block diagram showing a functional configuration of the controller 20. The controller 20 includes a machining control unit 36, a turning position acquisition unit 37, a tool change control unit 38, a sway amount acquisition unit 39, a turning position adjustment unit 40, and an origin point correcting unit 41.

The machining control unit 36 controls the spindle motor 22, the Z-axis motor 26, as well as an X-axis motor and a Y-axis motor that drive a work table, so that a workpiece is cut by the tool 24 into a shape defined by a numerical control program (NC program). The work table, the X-axis motor, and the Y-axis motor are not shown in the drawings.

The turning position acquisition unit 37 inputs the rotational position of the turning drive motor 33 from the rotation sensor 35, and calculates and acquires the turning position of the turret 30 from the rotational position of the turning drive motor 33. The turning position acquisition unit 37 calculates the turning position on the basis of an amount of turning with respect to an origin point, which is a specific turning position of the turret 30 that is set in advance. For example, with the origin point being set at 0 degrees, the turning position is indicated as lying within a range of from 0 to 360 degrees. Moreover, the origin point is set to the turning position of the turret 30 at the time that the spindle 14 and one of the grips 32 (for example, the first grip) that serves as a reference coincide with each other in the turning direction of the turret 30.

The tool change control unit 38 controls the Z-axis motor 26 and the turning drive motor 33 so as to change or replace the tool 24 attached to the spindle 14 with a desired tool 24. When the tool 24 attached to the spindle 14 is to be changed, at first, the tool change control unit 38 controls the Z-axis motor 26 so as to move the spindle head 12 from a side in the Z-axis negative direction to a side in the Z-axis positive direction, and thereby move the spindle head 12 to a tool change position. Consequently, the turret 30 is swung so that the grip 32 approaches toward the spindle 14 along the cam 12a, and the tool 24 is transferred from the spindle 14 to the grip 32. When the tool 24 is transferred from the spindle 14 to the grip 32, the tool change control unit 38 controls the turning drive motor 33 in a manner so that the turret 30 is placed at a turning position corresponding to the grip 32 in which the desired tool 24 is retained. At this time, the tool change control unit 38 controls the turning drive motor 33 in accordance with the turning position of the turret 30 calculated by the turning position acquisition unit 37. In addition, the tool change control unit 38 controls the Z-axis motor 26 so as to move the spindle head 12 from the tool change position toward a side in the Z-axis negative direction. Consequently, the tool 24 is transferred from the grip 32 onto the spindle 14. When the tool change control unit 38 controls the Z-axis motor 26 so as to move the spindle head 12 further toward the side in the Z-axis negative direction, the turret 30 is swung along the cam 12a in a manner so that the grip 32 separates away from the spindle 14.

The sway amount acquisition unit 39 receives a signal from a vibration sensor 44 (FIG. 3), which is provided in a tool 24 for adjustment, as will be described later. The sway amount acquisition unit 39 calculates and acquires an amount of sway (a movement due to some positional deviation) of the tool 24 at the time that the tool 24 is transferred between the spindle 14 and the grip 32. The turning position acquisition unit 37 acquires the rotational position of the turning drive motor 33 from the rotation sensor 35, and calculates and acquires the turning position with respect to the origin point of the turret 30. The turning position adjustment unit 40 controls the turning drive motor 33 to thereby adjust the turning position of the turret 30, in a manner so that the amount of sway of the tool 24 becomes small when the tool 24 is transferred between the spindle 14 and the grip 32. The origin point correcting unit 41 corrects the origin point of the turret 30 in accordance with the adjustment amount, at the time that the turning position of the turret 30 is adjusted by the turning position adjustment unit 40.

[Regarding Correction of the Origin Point]

As stated previously, the turning position acquisition unit 37 calculates the turning position of the turret 30 on the basis of an amount of turning with respect to an origin point, which is a specific turning position of the turret 30 that is set in advance. When the machine tool 10 is used over a long period of time, there is a possibility that a deviation may occur between the actual origin point of the turret 30 and the origin point of the turret 30 that is set in the turning position acquisition unit 37. Consequently, a deviation occurs between the turning position of the turret 30 calculated by the turning position acquisition unit 37 and the actual turning position of the turret 30. When the turning position of the turret 30 calculated by the turning position acquisition unit 37 deviates or becomes shifted with respect to the actual turning position of the turret 30, then in order to change the tool 24 that is attached to the spindle 14, the positions of the spindle 14 and the grip 32 are shifted when the turret 30 is turned to a turning position corresponding to the grip 32 in which a desired tool 24 is retained. In addition, there is a concern that the tool 24 may not be transferred reliably between the spindle 14 and the grip 32. Therefore, it is necessary to eliminate any deviation between the actual position of the origin point of the turret 30, and the position of the origin point of the turret 30 that is set in the turning position acquisition unit 37.

Figure 3:
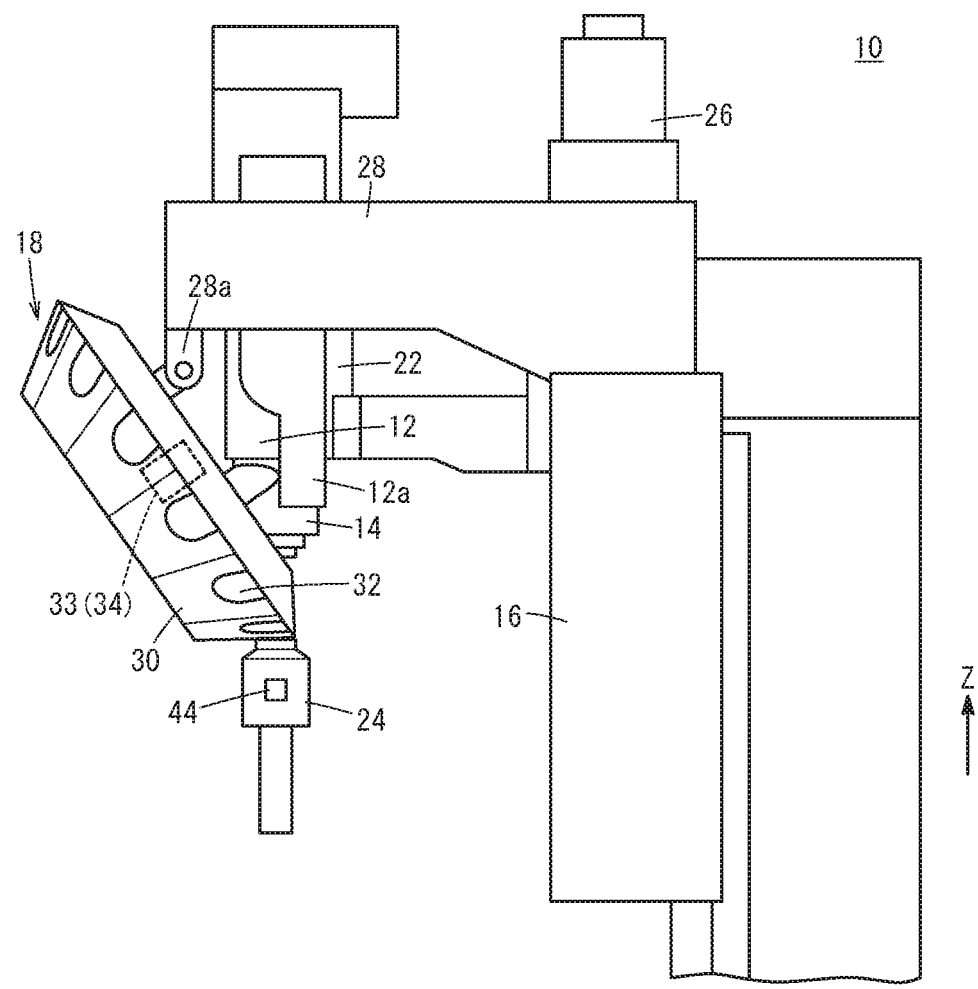
FIG. 3 is a view showing a machine tool in a state in which a tool used for origin point correction is attached to a grip of a turret.

FIG. 3 is a view showing the machine tool 10 in a state in which a tool 24 used for origin point correction is attached to a grip 32 of the turret 30. When carrying out correction of the origin point, all of the tools 24 are temporarily removed from the spindle 14 and the grips 32, and the tool 24 used for origin point correction is attached to one of the grips 32. The vibration sensor 44 is provided in the tool 24 for origin point correction. The grip 32 is retained in a movable manner so that the tool 24 can be swung in left and right directions so as to absorb to a certain extent any positional deviation between the spindle 14 and the grip 32 when the tool 24 is transferred between the spindle 14 and the grip 32. The vibration sensor 44 detects the magnitude of vibration of the tool 24 at the time that the tool 24 is transferred between the spindle 14 and the grip 32. The magnitude of vibration of the tool 24 detected at this time has a high correlation with the amount of sway of the tool 24. The vibration sensor 44 transmits the detected magnitude of vibration of the tool 24 by wireless signals to the sway amount acquisition unit 39 of the controller 20. The sway amount acquisition unit 39 calculates the amount of sway of the tool 24 from the received magnitude of vibration of the tool 24.

Figure 4:
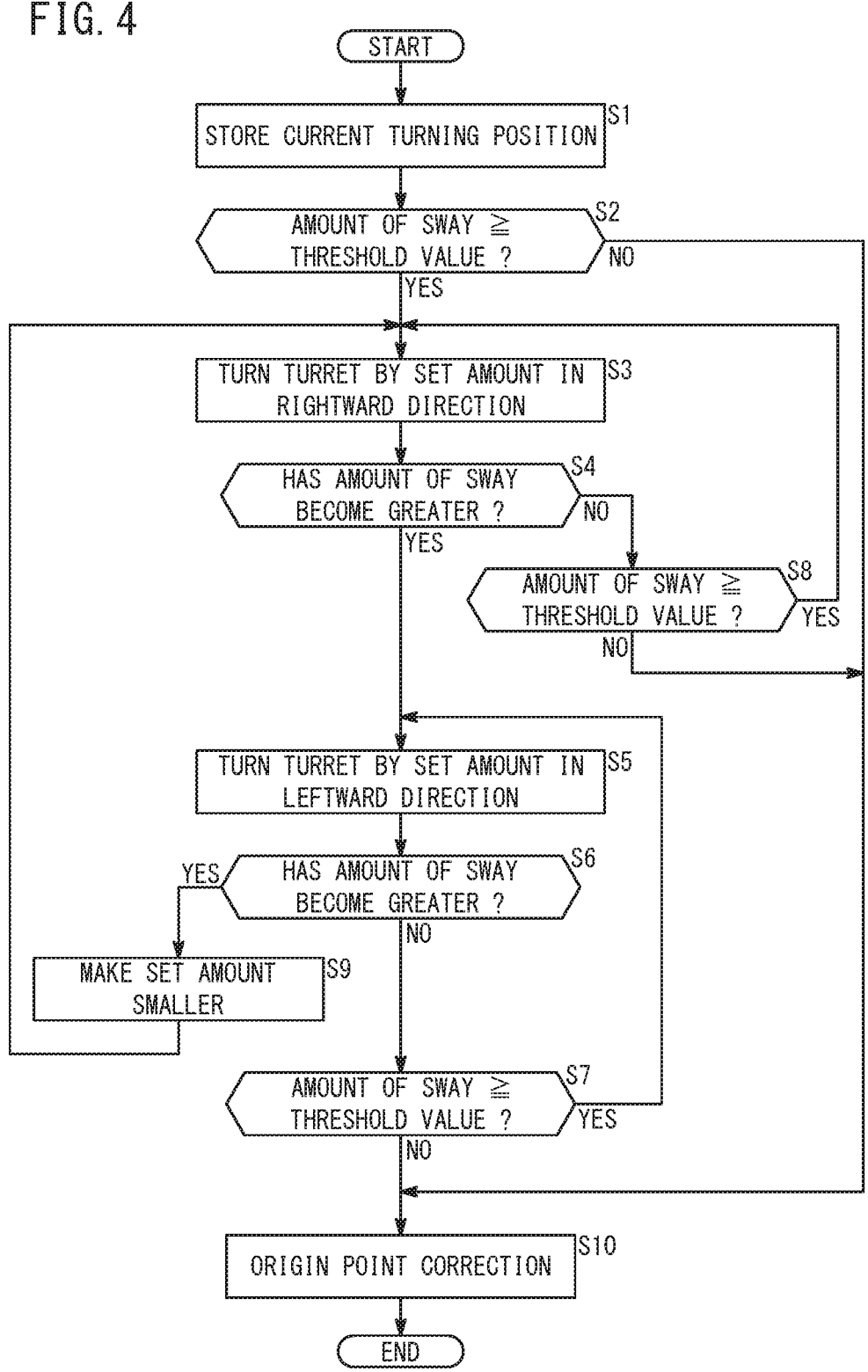
FIG. 4 is a flowchart showing a process flow performed in a tool change control unit, a turning position adjustment unit, and an origin point correcting unit.

FIG. 4 is a flowchart showing a process flow performed in the tool change control unit 38, the turning position adjustment unit 40, and the origin point correcting unit 41. The following process is started from a state in which the position of the spindle 14 in the Z-axis direction is a tool change position, which is a position at the time that the tool 24 is transferred between the grip 32 and the spindle 14.

In step S1, the tool change control unit 38 controls the turning drive motor 33 on the basis of the turning position of the turret 30 calculated by the turning position acquisition unit 37, and turns the turret 30 in a manner so that the grip 32 in which the tool 24 for origin point correction is mounted is placed in a tool change turning position. In addition, the origin point correcting unit 41 stores the current turning position of the turret 30, which was calculated by the turning position acquisition unit 37, and then the process proceeds to step S2.

In step S2, the tool change control unit 38 controls the Z-axis motor 26 to move the spindle head 12 in the Z-axis negative direction from the tool change position. At this time, the tool 24 is transferred from the grip 32 onto the spindle 14. In addition, the turning position adjustment unit 40 determines whether or not the amount of sway of the tool 24 when the tool 24 is transferred from the grip 32 onto the spindle 14 is greater than or equal to a preset threshold value. If the amount of sway of the tool 24 is greater than or equal to the threshold value, the process proceeds to step S3, and if the amount of sway of the tool 24 is less than the threshold value, the process proceeds to step S10.

In step S3, the tool change control unit 38 controls the Z-axis motor 26 to move the spindle head 12 in the Z-axis positive direction so as to return to the tool change position. At this time, the tool 24 is transferred from the spindle 14 to the grip 32. In addition, the turning position adjustment unit 40 controls the turning drive motor 33 to turn the turret 30 by the set amount that was set in advance, in a rightward turning direction when viewed from the front, whereupon the process proceeds to step S4.

In step S4, the tool change control unit 38 controls the Z-axis motor 26 to move the spindle head 12 in the Z-axis negative direction from the tool change position. At this time, the tool 24 is transferred from the grip 32 onto the spindle 14. In addition, the turning position adjustment unit 40 determines whether or not the amount of sway of the tool 24 when the tool 24 is transferred from the grip 32 onto the spindle 14 has become greater than the amount of sway of the tool 24 detected in step S2. If the amount of sway of the tool 24 has become greater, the process proceeds to step S5. In the case that the amount of sway of the tool 24 is the same, or if the amount of sway of the tool 24 has become smaller, the process proceeds to step S8.

In step S5, the tool change control unit 38 controls the Z-axis motor 26 to move the spindle head 12 in the Z-axis positive direction so as to return to the tool change position. At this time, the tool 24 is transferred from the spindle 14 to the grip 32. In addition, the turning position adjustment unit 40 controls the turning drive motor 33 to turn the turret 30 by the set amount that was set in advance, in a leftward turning direction, whereupon the process proceeds to step S6.

In step S6, the tool change control unit 38 controls the Z-axis motor 26 to move the spindle head 12 in the Z-axis negative direction from the tool change position. At this time, the tool 24 is transferred from the grip 32 onto the spindle 14. In addition, the turning position adjustment unit 40 determines whether or not the amount of sway of the tool 24 when the tool 24 is transferred from the grip 32 onto the spindle 14 has become greater than the amount of sway of the tool 24 detected in step S2. If the amount of sway of the tool 24 has become greater, the process proceeds to step S9. If the amount of sway of the tool 24 is the same or has become smaller, the process proceeds to step S7.

In step S7, the turning position adjustment unit 40 determines whether or not the amount of sway of the tool 24 when the tool 24 is transferred from the grip 32 onto the spindle 14 is greater than or equal to the preset threshold value. When the amount of sway of the tool 24 is greater than or equal to the threshold value, the process returns to step S5. When the amount of sway of the tool 24 is less than the threshold value, the process proceeds to step S10.

In step S8, after having determined in step S4 that the amount of sway of the tool 24 when the tool 24 is transferred from the grip 32 onto the spindle 14 is the same or has become smaller than the amount of sway of the tool 24 detected in step S2, the turning position adjustment unit 40 determines whether or not the amount of sway of the tool 24 when the tool 24 is transferred from the grip 32 onto the spindle 14 is greater than or equal to the preset threshold value. If the amount of sway of the tool 24 is greater than or equal to the threshold value, the process returns to step S3, and if the amount of sway of the tool 24 is less than the threshold value, the process proceeds to step S10.

In step S9, after having determined in step S6 that the amount of sway of the tool 24 when the tool 24 is transferred from the grip 32 onto the spindle 14 is greater than the amount of sway of the tool 24 detected in step S2, the turning position adjustment unit 40 sets the set amount at the time that the turret 30 is turned so as to be less than the size of the current set amount, and then the process returns to step S3.

In step S10, after having determined in step S2, step S7, or step S8 that the amount of sway of the tool 24 when the tool 24 is transferred from the grip 32 onto the spindle 14 is less than the threshold value, then in the origin point correcting unit 41, the origin point set in the turning position acquisition unit 37 is corrected, in accordance with the current turning position of the turret 30 calculated by the turning position acquisition unit 37 and the turning position of the turret 30 that was stored in step S1, whereupon the process is brought to an end. For example, in the case that the current turning position of the turret 30 is shifted in a rightward direction by one degree with respect to the turning position of the turret 30 that was stored in step S1, the current origin point is corrected so as to be shifted by one degree in the rightward direction.

Operations and Effects

In the case of correcting the origin point of the turret 30 set in the turning position acquisition unit 37 in a manner to coincide with the actual origin point of the turret 30, conventionally, the following operations have been performed by the operator. Concerning the turret 30, at the time that the turning position of the turret 30 has arrived at the origin point, a reference surface formed on the turret 30 becomes horizontal. The operator turns the turret 30 so that the reference surface thereof becomes horizontal, whereupon the turning position of the turret 30 at that time is also set as the origin point in the turning position acquisition unit 37. In order to turn the turret 30 in a manner so that the reference surface becomes horizontal, an operator has been required to turn the turret 30 manually while confirming a detection value of a dial gauge.

In order to perform the aforementioned operation, it is necessary to install the dial gauge in the vicinity of the reference surface of the turret 30, in a state in which the dial gauge is capable of being moved in the horizontal direction, which requires a significant amount of workload and increases the workload and number of steps. In addition, it is necessary to adjust the turning direction and the amount at which the turret 30 is turned, while observing detection values of the dial gauge. This is a difficult operation to perform except in the hands of a skilled operator.

Thus, according to the present embodiment, the turning position of the turret 30 is automatically adjusted by the machine tool 10, and the origin point of the turret 30 that is set in the turning position acquisition unit 37 is corrected. More specifically, the turning position adjustment unit 40 acquires the amount of sway of the tool 24 when the tool 24 is transferred between the spindle 14 and the grip 32, and if the amount of sway of the tool 24 is greater than or equal to the threshold value, the turret 30 is turned, and the turning drive motor 33 is controlled in a manner so that the amount of sway of the tool 24 becomes less than the threshold value. In addition, at the time that the turret 30 is turned by the turning drive motor 33 in a manner so that the amount of sway of the tool 24 becomes less than the threshold value, the origin point correcting unit 41 corrects the origin point corresponding to the turning position of the turret 30 acquired by the turning position acquisition unit 37.

The turning position of the turret 30 is automatically adjusted by the turning position adjustment unit 40, so that the positions of the spindle 14 and the grip 32 coincide with each other. Thus, adjustment of the turning position is performed automatically by the machine tool 10, whereby the workload and number of steps performed by the operator can be reduced. Further, regardless of the skill of the operator, it is possible to carry out adjustment of the turning position.

Further, according to the present embodiment, the turning position adjustment unit 40 controls the turning drive motor 33 so as to turn the turret 30 by a set amount in the rightward direction, and at the position where the turret 30 has been turned by the set amount in the rightward direction, if the amount of sway of the tool 24 when the tool 24 is transferred between the spindle 14 and the grip 32 has become less than the amount of sway of the tool 24 when the tool 24 is transferred at the position before the turret 30 is turned by the set amount in the rightward direction, then the turning position adjustment unit 40 controls the turning drive motor 33 so as to turn the turret 30 by the set amount in the rightward direction, until the amount of sway of the tool 24 becomes less than the threshold value. Further, at the position where the turret 30 has been turned by the set amount in the rightward direction, if the amount of sway of the tool 24 when the tool 24 is transferred between the spindle 14 and the grip 32 has become greater than the amount of sway of the tool 24 when the tool 24 is transferred at the position before the turret 30 is turned by the set amount in the rightward direction, then the turning position adjustment unit 40 controls the turning drive motor 33 so as to turn the turret 30 by the set amount in the leftward direction, until the amount of sway of the tool 24 becomes less than the threshold value. Thus, the turning position of the turret 30 can be adjusted by the turning position adjustment unit 40, so that the positions of the spindle 14 and the grip 32 coincide with each other.

Further, according to the present embodiment, at the position where the turret 30 has been turned by the set amount in the leftward direction, if the amount of sway of the tool 24 when the tool 24 is transferred between the spindle 14 and the grip 32 has become greater than the amount of sway of the tool 24 when the tool 24 is transferred at the position before the turret 30 is turned by the set amount in the rightward direction, then the turning position adjustment unit 40 sets the set amount so as to be smaller than the current size of the set amount. By setting the set amount to be smaller, the turning position adjustment unit 40 is capable of finely controlling the amount by which the turret 30 is turned, and the turning position of the turret 30 can be adjusted so that the positions of the spindle 14 and the grip 32 coincide with each other.

Further, according to the present embodiment, the sway amount acquisition unit 39 calculates the amount of sway of the tool 24 at the time that the tool 24 is transferred between the spindle 14 and the grip 32, in accordance with the magnitude of vibration of the tool 24 detected by the vibration sensor 44 provided in the tool 24. Since the vibration sensor 44 is capable of acquiring the magnitude of vibration of the tool 24, which has a high correlation with the amount of sway of the tool 24 when the tool 24 is transferred, it is possible for the sway amount acquisition unit 39 to highly accurately calculate the amount of sway of the tool 24 at the time that the tool 24 is transferred.

Second Embodiment

Figure 5:
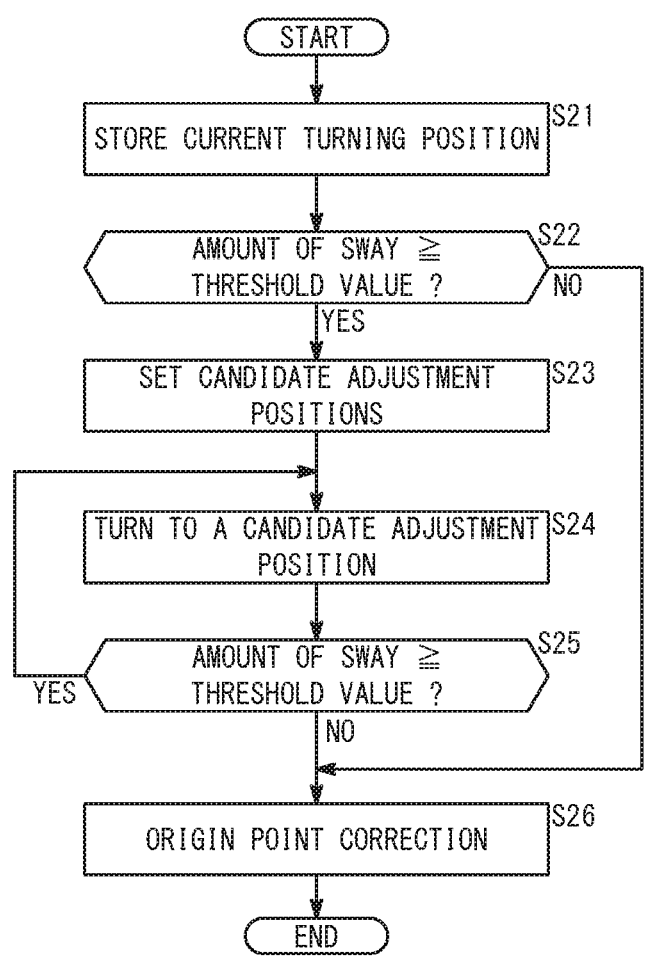
FIG. 5 is a flowchart showing a process flow performed in the tool change control unit, the turning position adjustment unit, and the origin point correcting unit.

The second embodiment differs from the first embodiment in relation to the processing content performed by the turning position adjustment unit 40. FIG. 5 is a flowchart showing a process flow performed in the tool change control unit 38, the turning position adjustment unit 40, and the origin point correcting unit 41. The following process is started from a state in which the position of the spindle 14 in the Z-axis direction is a tool change position, which is a position at the time that the tool 24 is transferred between the grip 32 and the spindle 14.

In step S21, the tool change control unit 38 controls the turning drive motor 33 on the basis of the turning position of the turret 30 calculated by the turning position acquisition unit 37, and turns the turret 30 in a manner so that the grip 32 in which the tool 24 for origin point correction is mounted is placed in the tool change turning position. In addition, the origin point correcting unit 41 stores the current turning position of the turret 30, which was calculated by the turning position acquisition unit 37, and then the process proceeds to step S22.

In step S22, the tool change control unit 38 controls the Z-axis motor 26 to move the spindle head 12 in the Z-axis negative direction from the tool change position. At this time, the tool 24 is transferred from the grip 32 onto the spindle 14. In addition, the turning position adjustment unit 40 determines whether or not the amount of sway of the tool 24 when the tool 24 is transferred from the grip 32 onto the spindle 14 is greater than or equal to a preset threshold value. If the amount of sway of the tool 24 is greater than or equal to the threshold value, the process proceeds to step S23, and if the amount of sway of the tool 24 is less than the threshold value, the process proceeds to step S26.

In step S23, the turning position adjustment unit 40 sets a plurality of candidate adjustment positions within a setting range in both left and right directions with respect to the current turning position of the turret 30, and then the process proceeds to step S24.

In step S24, the tool change control unit 38 controls the Z-axis motor 26 to move the spindle head 12 in the Z-axis positive direction so as to return to the tool change position. At this time, the tool 24 is transferred from the spindle 14 to the grip 32. In addition, the turning position adjustment unit 40 selects one candidate adjustment position from among the candidate adjustment positions that were set in step S23 but have not yet been selected, and controls the turning drive motor 33 in a manner so that the turning position of the turret 30 becomes placed at the selected candidate adjustment position, whereupon the process proceeds to step S25.

In step S25, the tool change control unit 38 controls the Z-axis motor 26 to move the spindle head 12 in the Z-axis negative direction from the tool change position. At this time, the tool 24 is transferred from the grip 32 onto the spindle 14. In addition, the turning position adjustment unit 40 determines whether or not the amount of sway of the tool 24 when the tool 24 is transferred from the grip 32 onto the spindle 14 is greater than or equal to a preset threshold value. When the amount of sway of the tool 24 is greater than or equal to the threshold value, the process returns to step S24. When the amount of sway of the tool 24 is less than the threshold value, the process proceeds to step S26.

In step S26, after having determined in step S22 or step S25 that the amount of sway of the tool 24 when the tool 24 is transferred from the grip 32 onto the spindle 14 is less than the threshold value, the origin point is corrected in accordance with the current turning position of the turret 30 calculated by the turning position acquisition unit 37 and the turning position of the turret 30 that was stored in step S21, whereupon the process is brought to an end.

Operations and Effects

According to the present embodiment, the turning position adjustment unit 40 sets a plurality of candidate adjustment positions within a setting range in both directions with respect to the present turning position of the turret 30, and controls the turning drive motor 33 so as to turn the turret 30 to the respective candidate adjustment positions until the amount of sway of the tool 24 when the tool 24 is transferred between the spindle 14 and the grip 32 at a position where the turret 30 has been turned to each candidate position becomes less than the threshold value. Thus, the turning position of the turret 30 can be adjusted by the turning position adjustment unit 40, so that the positions of the spindle 14 and the grip 32 coincide with each other.

Third Embodiment

According to the first embodiment and the second embodiment, the turning position of the turret 30 after the turning position adjustment has been performed by the turning position adjustment unit 40 is not necessarily the origin point. In the first embodiment and the second embodiment, the origin point set in the turning position acquisition unit 37 is corrected corresponding to a difference between the turning position of the turret 30 calculated by the turning position acquisition unit 37 prior to the turning position adjustment being performed by the turning position adjustment unit 40, and the turning position of the turret 30 calculated by the turning position acquisition unit 37 after adjustment of the turning position has been performed thereon by the turning position adjustment unit 40. Although such a method is effective in the case that the deviation between the position of the origin point of the turret 30 set in the turning position acquisition unit 37 and the actual position of the origin point turret 30 is not so large, this method cannot contend with a case in which the deviation is large.

Figure 6:
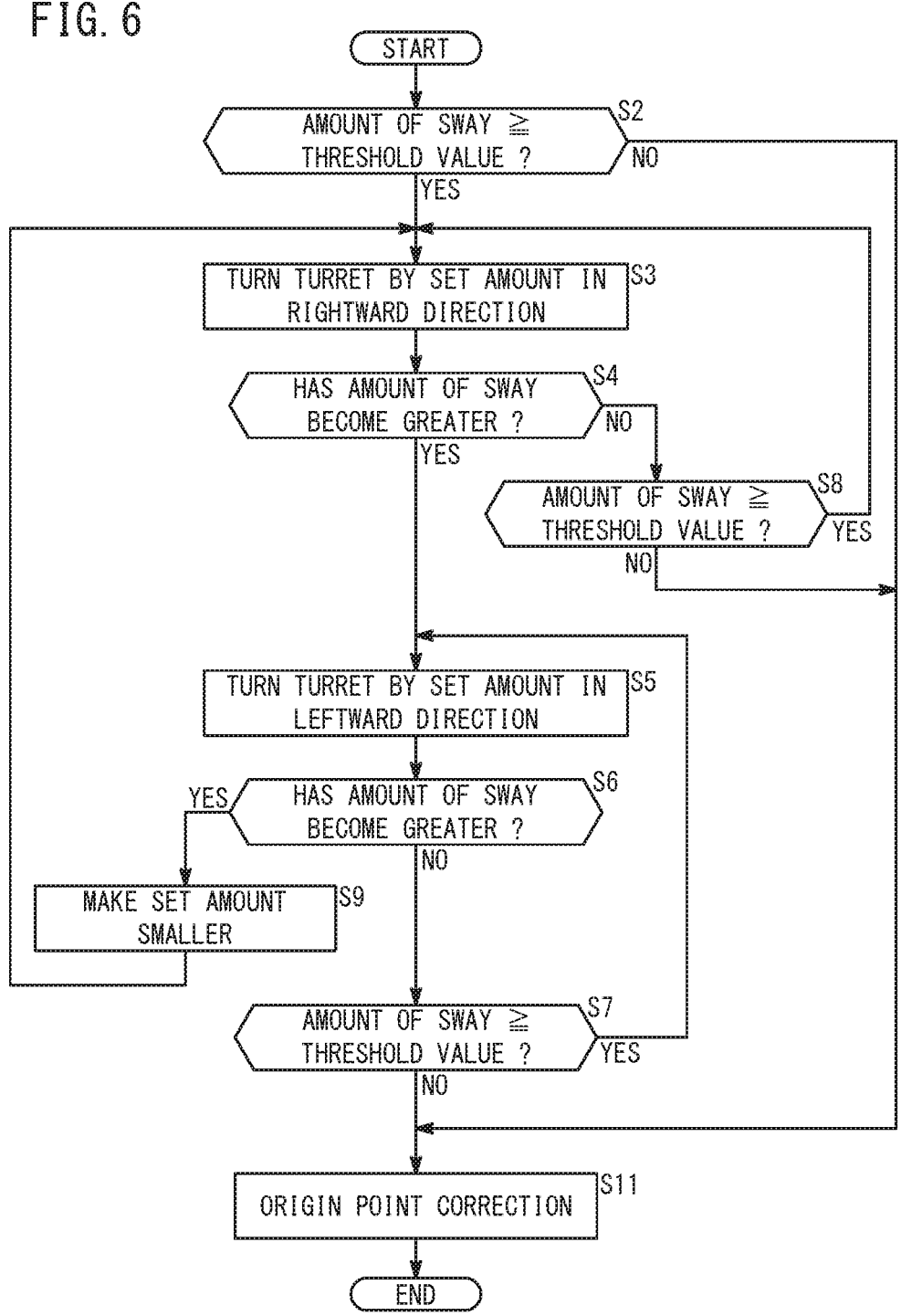
FIG. 6 is a flowchart showing a process flow performed in the tool change control unit, the turning position adjustment unit, and the origin point correcting unit.

According to the third embodiment, the operator carries out a portion of the turning position adjustment, and thereafter, the turning position of the turret 30 is adjusted under the control of the turning position adjustment unit 40. The third embodiment differs from the first embodiment in relation to a portion of the processing content performed by the turning position adjustment unit 40. FIG. 6 is a flowchart showing a process flow performed in the tool change control unit 38, the turning position adjustment unit 40, and the origin point correcting unit 41.

The process shown in FIG. 6 is implemented after the turning position of the turret 30 has been adjusted by the operator in a manner so that the turning position of the turret 30 is placed at the origin point. Moreover, without using a meter or the like, the operator may simply adjust the turning position of the turret 30 to such an extent that the spindle 14 and a grip 32 serving as a reference (for example, the first grip) roughly coincide with each other in the turning direction of the turret 30.

As for the differences between the process shown in FIG. 6 and the process shown in FIG. 4 of the first embodiment, there are two points in that: 1) in the process shown in FIG. 6, the process of step S1 is not carried out; and 2) the content of the process of step S11 differs from the content of the process of step S10 of the first embodiment. The processes from step S2 to step S9 are the same as the processes shown in FIG. 4 of the first embodiment, and therefore, description thereof is omitted.

In step S11, after having determined in step S2, step S7, or step S8 that the amount of sway of the tool 24 when the tool 24 is transferred from the grip 32 onto the spindle 14 is less than the threshold value, then in the origin point correcting unit 41, a correction is performed to set the current turning position of the turret 30 calculated by the turning position acquisition unit 37 to the origin point, whereupon the process is brought to an end.

Operations and Effects

According to the present embodiment, after the turning position of the turret 30 has been adjusted in a manner so that the turning position of the turret 30 becomes placed at the origin point manually by the operator, in the turning position adjustment unit 40, a determination is made as to whether or not the amount of sway of the tool 24 at the time that the tool 24 is transferred between the spindle 14 and the grip 32 is greater than or equal to a threshold value.

When the amount of sway of the tool 24 at the time that the tool 24 is transferred is less than the threshold value, a correction is carried out in the origin point correcting unit 41 to set to the origin point the turning position of the turret 30, on which adjustment was performed manually by the operator so as to place the turret 30 at the origin point.

Further, when the amount of sway of the tool 24 when the tool 24 is transferred is greater than or equal to the threshold value, the turret 30 is turned, and in the turning position adjustment unit 40, the turning drive motor 33 is controlled in a manner so that the amount of sway of the tool 24 becomes less than the threshold value. In addition, in the origin point correcting unit 41, a correction is performed to set to the origin point the turning position of the turret 30, on which adjustment was performed by the turning drive motor 33 so that the amount of sway of the tool 24 becomes less than the threshold value.

Consequently, without using a meter or the like, the operator simply adjusts the turning position of the turret 30 so as to be placed in the vicinity of the origin point, and thereafter, the turning position is adjusted automatically by the turning position adjustment unit 40 so that the turning position of the turret 30 becomes the origin point. Thus, since a significant portion of adjustment of the turning position is performed automatically by the machine tool 10, the workload and number of steps performed by the operator can be reduced. Further, among the adjustments made to the turning position, since the machine tool 10 can automatically perform operations requiring skill of the operator, it is possible to carry out adjustment of the turning position regardless of the skill of the operator.

[Modification 1]

Figure 7:
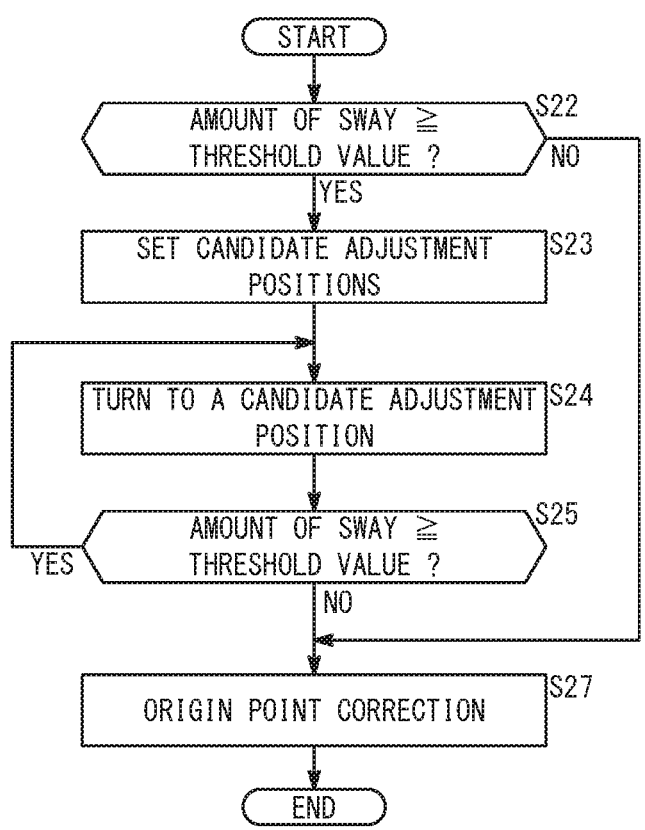
FIG. 7 is a flowchart showing a process flow performed in the tool change control unit, the turning position adjustment unit, and the origin point correcting unit.

According to the third embodiment, after the operator has manually carried out adjustment of the turning position of the turret 30, then using the turning position adjustment method for the turret 30 indicated by the first embodiment, the turning position of the turret 30 is adjusted so as to be placed at the origin point. However, the turning position adjustment method for the turret 30 indicated by the second embodiment may also be used. FIG. 7 is a flowchart showing a process flow performed in the tool change control unit 38, the turning position adjustment unit 40, and the origin point correcting unit 41. The process shown in FIG. 7 is implemented after the operator has carried out adjustment of the turning position of the turret 30 in a manner so that the turning position of the turret 30 is placed at the origin point. Moreover, without using a meter or the like, the operator may simply adjust the turning position of the turret 30 to such an extent that the spindle 14 and a grip 32 serving as a reference (for example, the first grip) roughly coincide with each other in the turning direction of the turret 30.

As for the differences between the process shown in FIG. 7 and the process shown in FIG. 5 of the second embodiment, there are two points in that: 1) in the process shown in FIG. 7, the process of step S21 is not carried out; and 2) the content of the process of step S27 differs from the content of the process of step S26 of the second embodiment. The processes from step S22 to step S25 are the same as the processes shown in FIG. 5 of the second embodiment, and therefore, description thereof is omitted.

In step S27, after having determined in step S22 or step S25 that the amount of sway of the tool 24 when the tool 24 is transferred from the grip 32 onto the spindle 14 is less than the threshold value, then in the origin point correcting unit 41, a correction is performed to set the current turning position of the turret 30 calculated by the turning position acquisition unit 37 to the origin point, whereupon the process is brought to an end.

Consequently, since a significant portion of adjustment of the turning position is performed automatically by the machine tool 10, the workload and number of steps performed by the operator can be reduced. Further, among the adjustment operations made to the turning position, since the machine tool 10 can automatically perform operations requiring skill of the operator, it is possible to carry out the adjustment operation of the turning position regardless of the skill of the operator.

[Modification 2]

In the first to third embodiments, a magnitude of vibration, which is a value correlated with the amount of sway of the tool 24, is detected by the vibration sensor 44. Instead of the vibration sensor 44, a value correlated with the amount of sway of the tool 24 may also be acquired by a vision sensor 48.

Figure 8:
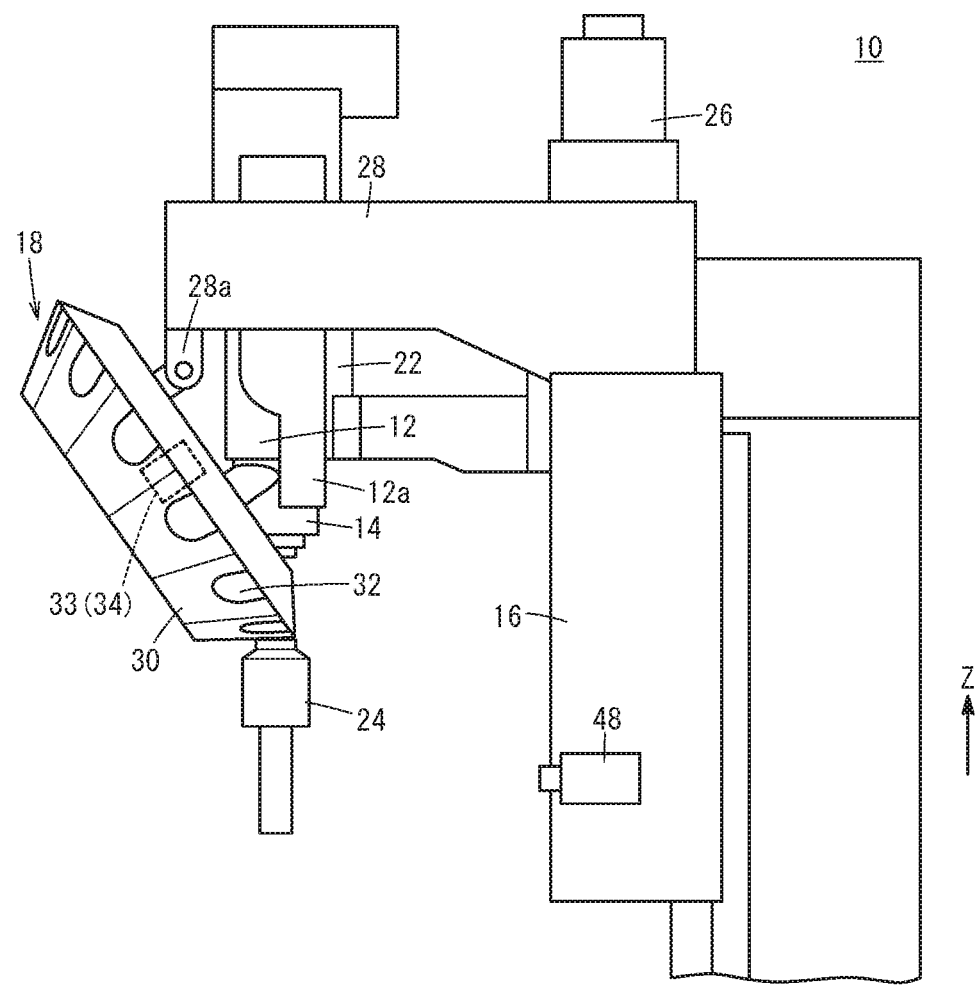
FIG. 8 is a schematic diagram of the vicinity of the spindle head of the machine tool.

FIG. 8 is a schematic diagram of the vicinity of the spindle head 12 of the machine tool 10. As shown in FIG. 8, the vision sensor 48 is fixed to the column 16 of the machine tool 10. The vision sensor 48 captures images of the distal end of the tool 24 at the time that the tool 24 is transferred between the spindle 14 and the grip 32, and calculates an amount of movement of the distal end of the tool 24 from the captured images. At this time, the tool 24 that is transferred between the spindle 14 and the grip 32 need not necessarily be the tool 24 used for origin point correction, in which a vibration sensor 44 or the like is provided in the interior thereof, as was utilized in the first to third embodiments.

The vision sensor 48 wirelessly transmits the computed amount of movement of the distal end of the tool 24 to the sway amount acquisition unit 39 of the controller 20. The sway amount acquisition unit 39 calculates the amount of sway of the tool 24 from the received amount of movement of the distal end of the tool 24. Consequently, without providing a sensor or the like in the tool 24, the amount of movement of the distal end of the tool 24, which is highly correlated with the amount of sway of the tool 24, can be acquired by the vision sensor 48 that is fixed to the column 16.

[Modification 3]

In the first to third embodiments, a magnitude of vibration, which is a value correlated with the amount of sway of the tool 24, is detected by the vibration sensor 44. Instead of the vibration sensor 44, a value correlated with the amount of sway of the tool 24 may also be acquired by a leveling instrument 50.

Figure 9:
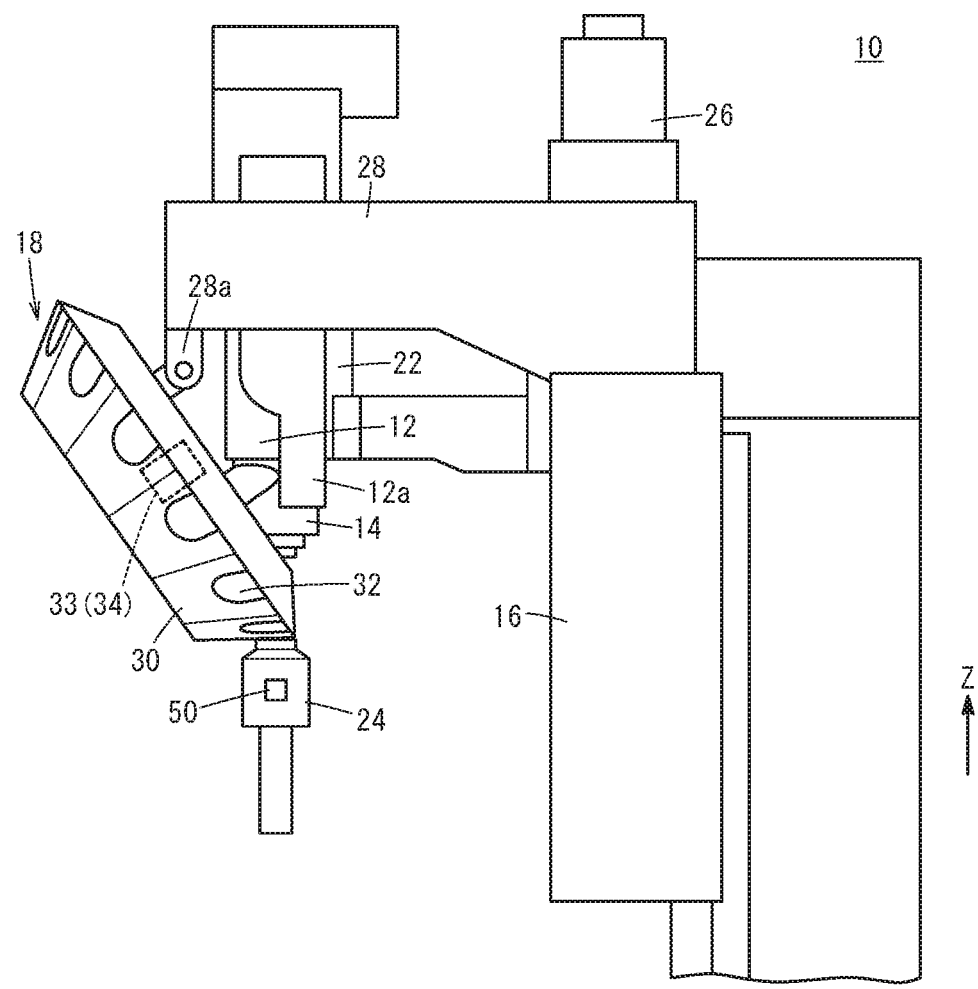
FIG. 9 is a schematic diagram of the vicinity of the spindle head of the machine tool.

FIG. 9 is a schematic diagram of the vicinity of the spindle head 12 of the machine tool 10. As shown in FIG. 9, the leveling instrument 50 is disposed on the tool 24. The leveling instrument 50 is a device that detects the angle of an object to be measured with respect to a horizontal plane, from the direction of gravitational acceleration acting on the tool 24. However, the leveling instrument 50 can be used to detect the magnitude of vibration of the tool 24 at the time that the tool 24 is transferred between the spindle 14 and the grip 32. The leveling instrument 50 transmits a detected value corresponding to the magnitude of vibration of the tool 24 by wireless signals to the sway amount acquisition unit 39 of the controller 20. The sway amount acquisition unit 39 calculates the amount of sway of the tool 24 from the received magnitude of vibration of the tool 24. The magnitude of vibration of the tool 24, which is highly correlated with the amount of sway of the tool 24, can be acquired by the leveling instrument 50.

[Modification 4]

In the first to third embodiments, a magnitude of vibration, which is a value correlated with the amount of sway of the tool 24, is detected by the vibration sensor 44. Instead of the vibration sensor 44, a value correlated with the amount of sway of the tool 24 may also be acquired by a touch probe 52.

Figure 10:
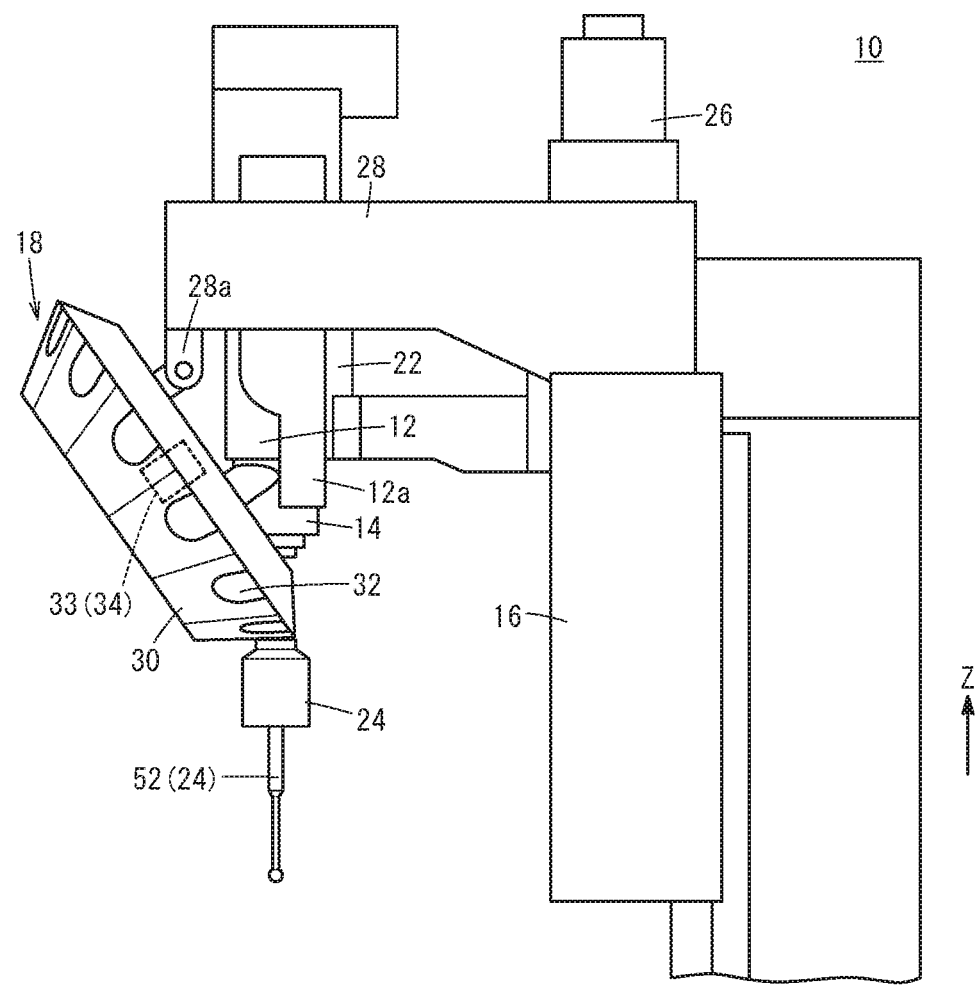
FIG. 10 is a schematic diagram of the vicinity of the spindle head of the machine tool.

FIG. 10 is a schematic diagram of the vicinity of the spindle head 12 of the machine tool 10. The touch probe 52 is attached in a detachable manner to the spindle 14 as a tool 24. The touch probe 52 is a device that detects that the distal end of the touch probe 52 has come into contact with an object to be measured. However, the presence or absence of vibration of the touch probe 52 can be detected when the touch probe 52 is transferred between the spindle 14 and the grip 32. Although a direct magnitude of the vibration cannot be detected by the touch probe 52, it is possible to detect the amount of sway of the touch probe 52 from a combination of the speed of movement of the spindle head 12 in the Z-axis direction when the touch probe 52 is transferred between the spindle 14 and the grip 32, and the presence or absence of vibration of the touch probe 52 at that time. Stated otherwise, when the amount of sway of the touch probe 52 is small, unless the speed of movement of the spindle head 12 is high, the touch probe 52 is not capable of detecting vibration. However, when the amount of sway of the touch probe 52 is large, even if the speed of movement of the spindle head 12 is low, it is possible for vibration to be detected by the touch probe 52.

The touch probe 52 transmits the detected presence or absence of vibration of the distal end of the touch probe 52 by wireless signals to the sway amount acquisition unit 39 of the controller 20. The sway amount acquisition unit 39 calculates the amount of sway of the tool 24 from the presence or absence of vibration of the distal end of the touch probe 52, and the speed of movement of the spindle head 12 at that time. Moreover, the touch probe 52 may be attached to the spindle 14 during machining, and used for the purpose of detecting the dimensions of the workpiece. Consequently, without using a dedicated tool 24 for origin point correction processing, it is possible to acquire a value highly correlated with the amount of sway of the tool 24.

The present invention is not limited to the embodiments described above, and it goes without saying that the embodiments can be freely modified within a range that does not deviate from the essence and gist of the present invention as set forth in the appended claims.

Technical Concepts Obtained from the Embodiments

Technical concepts which can be grasped from the above-described embodiments will be described below.

In the machine tool (10) including the tool changer (18) configured to change the tool (24) mounted on the spindle (14) by way of the turret (30) provided with the plurality of grips (32) for retaining the tool (24), there are included the turning drive unit (34) configured to turn the turret (30), the turning position acquisition unit (37) configured to acquire a turning position of the turret (30) with respect to an origin point, the sway amount acquisition unit (39) configured to acquire an amount of sway of the tool (24) when the tool (24) is transferred between the grip (32) and the spindle (14), the turning position adjustment unit (40) configured to control the turning drive unit (34) so that, when the tool (24) is transferred, if the amount of sway of the tool (24) is greater than or equal to a threshold value, the turret (30) is turned and the amount of sway of the tool (24) becomes less than the threshold value, and the origin point correcting unit (41) configured to correct the origin point in accordance with the turning position of the turret (30) acquired by the turning position acquisition unit (37), when the turret (30) is turned by the turning drive unit (34) so that the amount of sway of the tool (24) becomes less than the threshold value. In accordance with such features, it is possible to reduce the workload and number of steps performed by the operator. Further, regardless of the skill of the operator, it is possible to carry out an operation to adjust the turning position.

In the above-described machine tool (10), the turning position adjustment unit (40) may be configured to control the turning drive unit (34) so that, when the tool (24) is transferred at a position where the turret (30) has been turned by the operator so as to be at the origin point, if the amount of sway of the tool (24) is greater than or equal to the threshold value, the turret (30) is turned and the amount of sway of the tool (24) becomes less than the threshold value. In addition, the origin point correcting unit (41) may be configured to perform a correction so that, when the tool (24) is transferred at a position where the turret (30) has been turned by the operator so as to be at the origin point, if the amount of sway of the tool (24) is less than the threshold value, then when the turret (30) is turned by the operator so as to be at the origin point, the turning position of the turret (30) acquired by the turning position acquisition unit (37) is set as the origin point, and further, perform a correction so that, when the tool (24) is transferred at the position where the turret (30) has been turned by the operator so as to be at the origin point, if the amount of sway of the tool (24) is greater than or equal to the threshold value, then when the turret (30) is turned by the turning drive unit (34) in a manner so that the amount of sway of the tool (24) becomes less than the threshold value, the turning position of the turret (30) acquired by the turning position acquisition unit (37) is set as the origin point. In accordance with such features, even in the case that the origin point of the turret (30) that is set in the turning position acquisition unit (37), and the actual origin point of the turret (30) deviate significantly from each other, an increase in the workload and number of steps performed by the operator is suppressed while correction of the origin point can be performed.

In the above-described machine tool (10), the turning position adjustment unit (40) may be configured to control the turning drive unit (34) so as to turn the turret (30) by a set amount in one direction, control the turning drive unit (34) so that, when the tool (24) is transferred at a position where the turret (30) has been turned by the set amount in the one direction, if the amount of sway of the tool (24) has become less than the amount of sway of the tool (24) when the tool (24) is transferred at a position before the turret (30) is turned by the set amount in the one direction, the turret (30) is turned by the set amount in the one direction until the amount of sway of the tool (24) becomes less than the threshold value, and further, control the turning drive unit

(34) so that, when the tool (24) is transferred at the position where the turret (30) has been turned by the set amount in the one direction, if the amount of sway of the tool (24) has become greater than the amount of sway of the tool (24) when the tool (24) is transferred at the position before the turret (30) is turned by the set amount in the one direction, the turret (30) is turned by the set amount in another direction until the amount of sway of the tool (24) becomes less than the threshold value. Thus, the turning position of the turret (30) can be adjusted by the turning position adjustment unit (40), in a manner so that the positions of the spindle (14) and the grip (32) coincide with each other.

In the above-described machine tool (10), when the tool (24) is transferred at a position where the turret (30) has been turned by the set amount in the other direction, if the amount of sway of the tool (24) has become greater than the amount of sway of the tool (24) when the tool (24) is transferred at the position before the turret (30) is turned by the set amount in the one direction, the turning position adjustment unit (40) may be configured to set the set amount so as to be smaller than a current size of the set amount. Thus, the turning position adjustment unit (40) is capable of finely controlling the amount by which the turret (30) is turned, and the turning position of the turret (30) can be adjusted so that the positions of the spindle (14) and the grip (32) coincide with each other.

In the above-described machine tool (10), the turning position adjustment unit (40) may be configured to set a plurality of candidate adjustment positions within a setting range in both turning directions of the turret (30), and may control the turning drive unit (34) so as to turn the turret (30) to the respective candidate adjustment positions until the amount of sway of the tool (24) when the tool (24) is transferred becomes less than the threshold value at any of the candidate adjustment positions. Thus, the turning position of the turret (30) can be adjusted by the turning position adjustment unit (40), in a manner so that the positions of the spindle (14) and the grip (32) coincide with each other.

In the above-described machine tool (10), the sway amount acquisition unit (39) may be configured to calculate the amount of sway in accordance with an amount of movement of the tool (24) detected by a vision sensor (48). In accordance with this feature, without providing a sensor or the like in the tool (24), the amount of movement of the distal end of the tool (24), which is highly correlated with the amount of sway of the tool (24) when the tool (24) is transferred, can be acquired by the vision sensor (48) that is fixed to the column (16).

In the above-described machine tool (10), the sway amount acquisition unit (39) may be configured to calculate the amount of sway in accordance with a magnitude of vibration of the tool (24) detected by a vibration sensor (44) provided in the tool (24). In accordance with this feature, the vibration sensor (44) is capable of acquiring the magnitude of vibration of the tool (24), which is highly correlated with the amount of sway of the tool (24), at the time that the tool (24) is transferred.

In the above-described machine tool (10), the sway amount acquisition unit (39) may be configured to calculate the amount of sway in accordance with a magnitude of vibration of the tool (24) detected by a leveling instrument (50) disposed on the tool (24). In accordance with this feature, the vibration sensor (44) is capable of acquiring the magnitude of vibration of the tool (24), which is highly correlated with the amount of sway of the tool (24), at the time that the tool (24) is transferred.

In the above-described machine tool (10), the sway amount acquisition unit (39) may be configured to calculate the amount of sway in accordance with a presence or absence of vibration of a touch probe (52) detected by the touch probe (52) which is attached to the spindle (14). In accordance with this feature, without using a dedicated tool (24) for origin point correction, it is possible to acquire a value highly correlated with the amount of sway of the tool (24).

In an origin point correcting method for correcting an origin point that serves as a reference for a turning position of the turret (30), in the machine tool (10) including the tool changer (18) configured to turn, by the turning drive unit (34), the turret (30) provided with the plurality of grips (32) for retaining the tool (24) to a turning position corresponding to a grip (32) that retains a desired tool (24), and to carry out change of the tool (24) which is mounted on the spindle (14), the method includes a sway amount acquisition step of acquiring an amount of sway of the tool (24) when the tool (24) is transferred between the grip (32) and the spindle (14), a turning position adjustment step of controlling the turning drive unit (34) so that, if the amount of sway of the tool (24) acquired in the sway amount acquisition step is greater than or equal to a threshold value, the turret (30) is turned and the amount of sway of the tool (24) becomes less than the threshold value, and an origin point correcting step of correcting an origin point in accordance with a turning position of the turret (30) acquired in the turning position adjustment step, when the turret (30) is turned by the turning drive unit (34) so that the amount of sway of the tool (24) becomes less than the threshold value. In accordance with such features, it is possible to reduce the workload and number of steps performed by the operator. Further, regardless of the skill of the operator, it is possible to carry out an operation to adjust the turning position.

In the above-described origin point correcting method, in the sway amount acquisition step, the amount of sway of the tool (24) may be acquired when the tool (24) is transferred at a position where the turret (30) has been turned by the operator so as to be at the origin point, and in the origin point correcting step, a correction may be performed so that, if the amount of sway of the tool (24) acquired in the sway amount acquisition step is less than the threshold value, then when the turret (30) is turned by the operator so as to be at the origin point, the turning position of the turret (30) is set as the origin point, and further, a correction may be performed so that, if the amount of sway of the tool (24) acquired in the sway amount acquisition step is greater than or equal to the threshold value, then in the turning position adjustment step, when the turret (30) is turned by the turning drive unit (34) in a manner so that the amount of sway of the tool (24) becomes less than the threshold value, the turning position of the turret (30) is set as the origin point. In accordance with such features, even in the case that the origin point of the turret (30) that is set in the turning position acquisition unit (37), and the actual origin point of the turret (30) deviate significantly from each other, an increase in the workload and number of steps performed by the operator is suppressed while correction of the origin point can be performed.

In the above-described origin point correcting method, in the turning position adjustment step, the turning drive unit (34) may be controlled so as to turn the turret (30) by a set amount in one direction, the turning drive unit (34) may be controlled so that, when the tool (24) is transferred at a position where the turret (30) has been turned by the set amount in the one direction, if the amount of sway of the tool (24) has become less than the amount of sway of the tool

(24) when the tool (24) is transferred at a position before the turret (30) is turned by the set amount in the one direction, the turret (30) is turned by the set amount in the one direction until the amount of sway of the tool (24) becomes less than the threshold value, and further, the turning drive unit (34) may be controlled so that, when the tool (24) is transferred at the position where the turret (30) has been turned by the set amount in the one direction, if the amount of sway of the tool (24) has become greater than the amount of sway of the tool (24) when the tool (24) is transferred at the position before the turret (30) is turned by the set amount in the one direction, the turret (30) is turned by the set amount in another direction until the amount of sway of the tool (24) becomes less than the threshold value. Thus, the turning position of the turret (30) can be adjusted by the turning position adjustment unit (40), in a manner so that the positions of the spindle (14) and the grip (32) coincide with each other.

In the above-described origin point correcting method, in the turning position adjustment step, when the tool (24) is transferred at a position where the turret (30) has been turned by the set amount in the other direction, if the amount of sway of the tool (24) has become greater than the amount of sway of the tool (24) when the tool (24) is transferred at the position before the turret (30) is turned by the set amount in the one direction, the set amount may be set to be smaller than a current size of the set amount. Thus, the turning position adjustment unit (40) is capable of finely controlling the amount by which the turret (30) is turned, and the turning position of the turret (30) can be adjusted so that the positions of the spindle (14) and the grip (32) coincide with each other.

In the above-described origin point correcting method, in the turning position adjustment step, a plurality of candidate adjustment positions may be set within a setting range in both turning directions of the turret (30), and the turning drive unit (34) may be controlled so as to turn the turret (30) to the respective candidate adjustment positions until the amount of sway of the tool (24) when the tool (24) is transferred becomes less than the threshold value at any of the candidate adjustment positions. Thus, the turning position of the turret (30) can be adjusted by the turning position adjustment unit (40), in a manner so that the positions of the spindle (14) and the grip (32) coincide with each other.

What is claimed is:

1. A machine tool including a tool changer configured to change a tool mounted on a spindle by way of a turret provided with a plurality of grips for retaining the tool, comprising:
    a turning drive motor configured to turn the turret;
    a controller operatively coupled to the machine tool and the turning drive motor; the controller programmed to perform the following steps:
    acquire a turning position of the turret with respect to an origin point;
    acquire an amount of sway of the tool when the tool is transferred between a grip of the plurality of grips and the spindle;
    control the turning drive motor so that, when the tool is transferred, if the amount of sway of the tool is greater than or equal to a threshold value, the turret is turned and the amount of sway of the tool becomes less than the threshold value; and
    correct the origin point in accordance with a turning position of the turret acquired, when the turret is turned by the turning drive motor so that the amount of sway of the tool becomes less than the threshold value.

2. The machine tool according to claim 1, wherein the controller is programmed to:
    control the turning drive motor so that, when the tool is transferred at a position where the turret has been turned by an operator so as to be at the origin point, if the amount of sway of the tool is greater than or equal to the threshold value, the turret is turned and the amount of sway of the tool becomes less than the threshold value; and
    perform a correction so that, when the tool is transferred at a position where the turret has been turned by the operator so as to be at the origin point, if the amount of sway of the tool is less than the threshold value, then when the turret is turned by the operator so as to be at the origin point, the turning position of the turret is set as the origin point; and
    perform a correction so that, when the tool is transferred at the position where the turret has been turned by the operator so as to be at the origin point, if the amount of sway of the tool is greater than or equal to the threshold value, then when the turret is turned by the turning drive motor in a manner so that the amount of sway of the tool becomes less than the threshold value, the turning position of the turret is set as the origin point.

3. The machine tool according to claim 1, wherein the controller is configured to:
    control the turning drive motor so as to turn the turret by a set amount in one direction;
    control the turning drive motor so that, when the tool is transferred at a position where the turret has been turned by the set amount in the one direction, if the amount of sway of the tool has become less than the amount of sway of the tool when the tool is transferred at a position before the turret is turned by the set amount in the one direction, the turret is turned by the set amount in the one direction until the amount of sway of the tool becomes less than the threshold value; and
    control the turning drive motor so that, when the tool is transferred at the position where the turret has been turned by the set amount in the one direction, if the amount of sway of the tool has become greater than the amount of sway of the tool when the tool is transferred at the position before the turret is turned by the set amount in the one direction, the turret is turned by the set amount in another direction until the amount of sway of the tool becomes less than the threshold value.

4. The machine tool according to claim 3, wherein, when the tool is transferred at a position where the turret has been turned by the set amount in the other direction, if the amount of sway of the tool has become greater than the amount of sway of the tool when the tool is transferred at the position before the turret is turned by the set amount in the one direction, the controller is configured to set the set amount so as to be smaller than a current size of the set amount.

5. The machine tool according to claim 1, wherein the controller is configured to set a plurality of candidate adjustment positions within a setting range in both turning directions of the turret, and control the turning drive motor so as to turn the turret to the respective candidate adjustment positions until the amount of sway of the tool when the tool is transferred becomes less than the threshold value at any of the candidate adjustment positions.

6. The machine tool according to claim 1, wherein the controller is configured to calculate the amount of sway in accordance with an amount of movement of the tool detected by a vision sensor.

7. The machine tool according to claim 1, wherein the controller is configured to calculate the amount of sway in accordance with a magnitude of vibration of the tool detected by a vibration sensor provided in the tool.

8. The machine tool according to claim 1, wherein the controller is configured to calculate the amount of sway in accordance with a magnitude of vibration of the tool detected by a leveling instrument disposed on the tool.

9. The machine tool according to claim 1, wherein the controller is configured to calculate the amount of sway in accordance with a presence or absence of vibration of a touch probe detected by the touch probe which is attached to the spindle.

* * * * *